United States Patent Office 2,824,085
Patented Feb. 18, 1958

2,824,085

FLAME RESISTANT POLYESTER RESINS PREPARED FROM REACTION OF A POLY (ALKYLENE) MALEATE AND A DIALKYL HYDROGEN PHOSPHITE

William Cummings, North Woodbury, Conn., assignor to United States Rubber Company, New York, N. Y., a corporation of New Jersey No Drawing. Application May 18, 1954
Serial No. 430,727

3 Claims. (Cl. 260—75)

This invention relates to improvements in making flame resistant alkyds, and their copolymers with cross-linking ethylenic ($CH_2=C<$) compounds.

An object of this invention is to obtain such improvements by reacting a conventional unsaturated alkyd of low acid number (such as obtained by reacting a glycol with an alpha-unsaturated dicarboxylic acid or its anhydride) with a dialkyl hydrogen phosphite to form an alkyd containing chemically-bound phosphorus. The proportions are generally on the order of 1 mole of the alkyd to 0.2 to 0.7 moles of the phosphite. Variations are permissible however, to accord with the desired combined content of phosphorus desired. The time is usually from about 3 to 5 hours at from about 130° to about 140° C. The nature of the reaction is not clear. During the reaction a small amount of alcohol evolves corresponding to the alkyl, aralkyl, or cycloalkyl group (R) of the phosphite

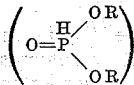

also, the acid number of the alkyd increases during the treatment. The acid number of the alkyd, before the reaction, is not in excess of 50. Such a value after the reaction may rise to a value of 60–100, whereas, a lower preferred acid number of from 1 to 9 for the unmodified alkyd, may rise to an acid number of 35–50 afterwards. In connection with dialkyl hydrogen phosphite reactions with poly(ethylene maleate), another product crystallizes and has been identified as monomeric ethylene maleate which can also, if desired, be isolated. Accordingly, the present method can be used to accomplish the preparation of both types of products.

The present phosphorus-containing alkyds exhibit a variation in properties, when cross-linked, dependent on the amount of combined phosphorus in the polyester alkyd. A range of resistance to flame, without being self-extinguishing, runs from about 3 to about 5 percent of phosphorus content in the resin derived from the modified fusible alkyd. With more than about 5% phosphorus in the resin self-extinguishing properties are observed. When the phosphorus content exceeds about 7 percent, there is a sacrifice in physical properties for the sake of self-extinguishing properties.

The following examples are given to illustrate the invention, parts being by weight:

*Example 1*

A mixture of maleic anhydride (450 parts), and ethylene glycol (142 parts) was heated at 180–190° C. for 4 hours while passing a slow stream of carbon dioxide through the stirred reaction mixture. Then ethylene glycol (145 parts) was added and heating as before at 180°–190° C. was continued for 5 hours. The acid number of the alkyd was 35.

A mixture of 142 parts of the above alkyd and 55 parts of dimethyl hydrogen phosphite was heated 5 hours at 130–140° C. with stirring under a blanket of carbon dioxide. As the reaction proceeded, well-formed crystals sublimed out onto the cooler parts of the apparatus. At the end of the reaction the sublimate was redissolved in the alkyd by heating.

Seventy (70) parts of alkyd, having a phosphorus content of 7.8%, were mixed with 30 parts styrene and 1.0 part benzoyl peroxide and made into a three-ply glass laminate. Curing was 15 minutes at 110° C. and 30 p. s. i.

The finished laminate was satisfactorily self-extinguishing when tested according to ASTM test D–568–53.

*Example 2*

A mixture of maleic anhydride (392 parts) and propylene glycol (335 parts) was heated at 200±5° C. for 4 hours while passing a slow stream of carbon dioxide through the stirred reaction mixture. The reaction was then continued under reduced pressure (50 mm. or less) for 1.5 hours. After a total reaction time of 6 hours at 200±5° C. the acid number of the alkyd was 9.

A mixture of 124 parts of this alkyd and 43.5 parts of dimethyl hydrogen phosphite was heated at 130–140° C. for 3.5 hours with stirring under a blanket of carbon dioxide. A sample of the product was reprecipitated from acetone into petroleum ether and dried by heating at 70–80° C. for 1.5 hours at 4–5 mm. pressure.

Calcd. for complete reaction: P, 7.35%. Found: P, 7.26%.

The phosphorus-containing alkyd (70 parts) was blended with styrene (30 parts) and benzoyl peroxide (1.0 part).

A three-ply fiber glass mat (Owens-Corning, T–19) laminate (13″ x 7″ x 0.1) was then made using the above resin and cured 15 minutes at 110° C. and 30 p. s. i. When tested for flame resistance by the ASTM test, D–568–53, this laminate proved to be self-extinguishing.

Comparable laminates made from 124 parts of the starting alkyd modified with 26.2 parts dimethyl hydrogen phosphite, and blended with 64.3 parts of styrene, were flame resistant without being self-extinguishing.

*Example 3*

A mixture of 142 parts of the alkyd of Example 1 and 69.1 parts of diethyl hydrogen phosphite was heated at 130–140° C. for 3.75 hours with stirring under a blanket of carbon dioxide. A sample of the product was precipitated from acetone solution by pouring into petroleum ether. After heating at 70–80° C. for 1.5 hours at 3–5 mm. the sample was analyzed for phosphorus.

Calcd. for complete reaction: P, 7.35%. Found: P, 8.78%.

A laminate made from this alkyd (70 parts) and styrene (30 part) according to the procedure of Example 2 was self-extinguishing.

Example 4

A mixture of the alkyd of Example 2 (156 parts) and dibutyl hydrogen phosphite (76 parts) was heated at 130–140° C. for 4 hours with stirring under a blanket of carbon dioxide. The product, after purification by precipitation from acetone with petroleum ether and drying by heating in vacuo, was analyzed for phosphorus.

Calcd. for complete reaction: P, 7.68%. Found: P, 5.1%.

A laminate made from this alkyd (70 parts) and styrene (30 parts) according to the procedure of Example 2 was not self-extinguishing but was flame retardant.

The foregoing examples show the usefulness of dimethyl, diethyl and di-n-butyl hydrogen phosphite. Other phosphites that may be used are di-n-propyl hydrogen phosphite, di-isobutyl hydrogen phosphite, di-sec.-butyl hydrogen phosphite, di-n-dodecyl hydrogen phosphite, di-2-ethylhexyl hydrogen phospite, di-benzyl hydrogen phosphite, di-cyclohexyl hydrogen phosphite, di-cyclopentyl hydrogen phosphite.

While styrene is disclosed in the examples, as the cross-linker, other ethylenic compounds may be used instead, e. g., diallyl phthalate, chloroprene, acrylic esters, e. g., methyl methacrylate, vinyl ketones, e. g., methyl vinyl ketone and triallyl cyanurate.

Suitable other glycols that may be used are diethylene glycol, triethylene glycol, neopentyl glycol. Mixtures of the glycols may also be used.

Other suitable acids for use in preparing the alkyd are chloro-maleic, fumaric, itaconic, mesaconic, and citraconic acids.

If desired, the alkyd used may be a modified alkyd, usually made by replacing part of the unsaturated acid with a non-alpha, beta-unsaturated carboxylic acid, e. g., phthalic, isophthalic, terephthalic, succinic, glutaric, diglycolic, the cyclohexane dicarboxylic acids, adipic, pimelic, suberic, sebacic and mixtures thereof. It is to be understood that the use of such modifying acids will result in a decrease in the ultimate phosphorus content, and so from the standpoint of having a reaction product of relatively higher phosphorus content, their use is less preferred. A practical minimum for flame-proofing is about 3.5% bound phosphorus. When halogen is also present, as for example in the use of chloromaleic acid, or 1,4,5,6,7,7-hexachlorobicyclo [2,2,1] hept-5-ene-2,3-dicarboxylic acid, made from hexachlorocyclopentadiene and maleic anhydride, 0.5–1.5% phosphorus may be present, depending on the chlorine content of the composition. In fact, the presence of phosphorus in a halogen-containing flame-resistant resin affords a minimum discoloration resulting from exposure to ultraviolet light and a maximum of flame resistance, as shown by the following example.

Example 5

A mixture of 1,4,5,6,7,7-hexachlorobicyclo [2,2,1] hept-5-ene-2,3-dicarboxylic anhydride (241 parts), maleic anhydride (58 parts), and ethylene glycol (68 parts) and propylene glycol (20 parts) was heated with stirring under a blanket of carbon dioxide. The temperature was maintained at 170–180° C. during a total heating period of 7 hours. The resulting alkyd had an acid number of 33.5. After cooling to 130° C., dimethyl hydrogen phosphite (25 parts) was added and heating at 130–140° C. continued for 2.5 hours.

The modified alkyd (70 parts), styrene (30 parts) and benzoyl peroxide (1.5 parts) were mixed and made into a glass mat laminate. This laminate was self-extinguishing in the ASTM D-568-53 test.

Castings were made of the resin derived from the original phosphorus free alkyd and also from the phosphorus-containing alkyd. Both were mixed in the ratio of 70 parts alkyd, 30 styrene, 1.5 benzoyl peroxide, and cured 15′ at 110° C. at 30 p. s. i. Both were exposed to a source of ultraviolet light. After 24 hours exposure, the phosphorus free resin was colored a light brown, whereas, the one containing phosphorus was unchanged from the original light color.

The following example is given to show that the method may be used to prepare the monomeric cyclic alkylene maleate.

Example 6

A mixture of 142 parts of the alkyd of Example 1 and 55 parts of dimethyl hydrogen phosphite was heated for 5 hours at 130–140° C. with stirring under a blanket of carbon dioxide. As the reaction proceeded, well-formed crystals sublimed out onto the cooler parts of the apparatus. They were removed and analyzed.

|  | Calcd. for Ethylene Maleate $C_6H_4O_4$ | Found |
|---|---|---|
| Saponification No | 786 | 776 |
| Percent Phosphorus | 0 | 0 |
| Mol. Wt. (cryoscopic in benzene) | 142 | 146 |
| Acid No | 0 | 0 |
| M. P. (sealed tube), ° C | | 103–5 |

It has been further characterized as monomeric ethylene maleate by reaction with cyclopentadiene in benzene at room temperature to give an adduct which was saponified to the known bicyclo [2,2,1] hept-5-ene-2,3-dicarboxylic acid. (Neut Eq: calcd. 92.0; found 91.3.)

The monomeric ethylene maleate is soluble in acetone, alcohol, hot benzene and hot water. It is insoluble in ligroin and ether.

Infrared examination of the product showed absorption due to C=C and only a very faint peak due to hydroxyl. There were no features on the spectrum inconsistent with the proposed structure.

While the foregoing discussion is concerned with monomeric ethylene maleate, the invention is equally applicable to making other monomeric alkylene maleates such as 1,2-propylene maleate, 1,2-butylene maleate, 1,2-amylene maleate.

Having thus described my invention, what I claim and desire to protect by Letters Patent is:

1. A method of making a phosphorus-bound fusible alkyd product which when cross-linked with a copolymerizable ethylenic compound containing the $CH_2=C<$ group provides a flame-resistant infusible copolymer resin which comprises reacting 1 mole proportion of an unsaturated alkyd selected from the class consisting of glycol polyesters of alpha-unsaturated dicarboxylic acids and mixtures of such acids with dicarboxylic acids free of polymerizable unsaturation, with from 0.2 to 0.7 mole proportion of a phosphite of the general formula

where R is a radical selected from the group consisting of alkyl, aralkyl, and cycloalkyl to provide in the alkyd from 0.5 to about 7 percent by weight of chemically-bound phosphorus.

2. A method of making a phosphorus-bound flexible alkyd product which when cross-linked with a copolymerizable ethylenic compound containing the $CH_2=C<$ group provides a flame-resistant infusible copolymer resin which comprises reacting 1 mole proportion of an unsaturated alkyd which is poly(alkylene) maleate, with from 0.2 to 0.7 mole proportion of dialkyl hydrogen phosphite to provide in the alkyd from 0.5 to about 7 percent by weight of chemically-bound phosphorus.

3. A method of making a phosphorus-bound fusible alkyd product which when cross-linked with a copolymerizable ethylenic compound containing the $CH_2=C<$ group provides a flame-resistant infusible copolymer resin which comprises reacting 1 mole proportion of a glycol polyester of an alpha-unsaturated dicarboxylic acid with from 0.2 to 0.7 mole proportion of a phosphite of the general formula $$HP(OR)_2$$
$$\parallel$$
$$O$$

where R is a radical selected from the group consisting of alkyl, aralkyl, and cycloalkyl to provide in the polyester from 0.5 to about 7 percent by weight of chemically-bound phosphorus.

References Cited in the file of this patent
UNITED STATES PATENTS

| | | |
|---|---|---|
| 2,437,046 | Rothrock et al. | Mar. 2, 1948 |
| 2,437,232 | Rothrock et al. | Mar. 2, 1948 |
| 2,543,635 | Loritsch | Feb. 27, 1951 |